United States Patent
Strawser et al.

(10) Patent No.: US 10,011,292 B2
(45) Date of Patent: Jul. 3, 2018

(54) COLLAPSIBLE STORAGE DEVICE FOR TEMPORARY ATTACHMENT TO A SHOPPING CART

(71) Applicants: Rebecca Strawser, Warren, OH (US); Bradley L. Strawser, Warren, OH (US)

(72) Inventors: Rebecca Strawser, Warren, OH (US); Bradley L. Strawser, Warren, OH (US)

(*) Notice: Subject to any disclaimer, the term of this patent is extended or adjusted under 35 U.S.C. 154(b) by 81 days.

(21) Appl. No.: 15/192,941

(22) Filed: Jun. 24, 2016

(65) Prior Publication Data

US 2016/0375921 A1 Dec. 29, 2016

Related U.S. Application Data

(60) Provisional application No. 62/184,033, filed on Jun. 24, 2015, provisional application No. 62/209,953, filed on Aug. 26, 2015.

(51) Int. Cl.
*B62B 3/00* (2006.01)
*B62B 3/14* (2006.01)

(52) U.S. Cl.
CPC ................. *B62B 3/1464* (2013.01)

(58) Field of Classification Search
CPC .................................................. B62B 3/1464
USPC ......................................................... 224/411
See application file for complete search history.

(56) References Cited

U.S. PATENT DOCUMENTS

| | | | | |
|---|---|---|---|---|
| 4,274,567 A | * | 6/1981 | Sawyer | A45C 15/02 108/44 |
| 4,560,096 A | * | 12/1985 | Lucas | B62B 3/1464 220/9.4 |
| 4,871,100 A | * | 10/1989 | Posner | B62B 3/1464 224/411 |
| 4,974,799 A | * | 12/1990 | Palmer | B62B 3/106 224/411 |
| 5,012,966 A | * | 5/1991 | Turner | B62B 3/1472 206/556 |
| 5,855,412 A | * | 1/1999 | Smith | B62B 3/144 190/2 |
| D484,664 S | | 12/2003 | Arceta | |
| D484,666 S | | 12/2003 | Caya | |
| D529,679 S | | 10/2006 | Meyer et al. | |
| D535,803 S | | 1/2007 | Shunk et al. | |
| D536,502 S | | 2/2007 | Weigand et al. | |
| D536,503 S | | 2/2007 | Weigand et al. | |
| D579,660 S | | 11/2008 | Snider | |
| 7,475,885 B2 | | 1/2009 | Kovath | |

(Continued)

*Primary Examiner* — Peter Helvey
(74) *Attorney, Agent, or Firm* — Porter, Wright, Morris & Arthur, LLP

(57) ABSTRACT

A storage device for removable attachment to a shopping cart includes a collapsible container having an interior storage space accessible through an upper opening; and an attachment assembly secured to the collapsible container and including at least one attachment for removably securing the collapsible container to the shopping cart. The at least one attachment can be one or more pairs of hooks of different sizes interchangeably and removably attached to the collapsible container. The attachment assembly includes an attachment bracket secured to the collapsible container that forms one or more pairs of spaced-apart predetermined attachment locations for the one or more pairs of hooks.

19 Claims, 14 Drawing Sheets

(56) References Cited

U.S. PATENT DOCUMENTS

| | | | | |
|---|---|---|---|---|
| D672,522 S | 12/2012 | Taylor et al. | | |
| 8,371,548 B1* | 2/2013 | Bishop | | A45C 5/045 224/406 |
| 2006/0201979 A1* | 9/2006 | Achilles | | A45C 13/02 224/411 |
| 2007/0114258 A1* | 5/2007 | Miller | | A45C 3/04 224/411 |
| 2009/0078731 A1* | 3/2009 | Yi | | A45C 3/04 224/411 |
| 2009/0101253 A1* | 4/2009 | Kinskey | | A45C 3/04 150/107 |
| 2009/0317021 A1* | 12/2009 | Taylor | | A45C 3/04 383/6 |
| 2010/0102100 A1* | 4/2010 | Hickey | | A45C 3/04 224/411 |
| 2010/0104223 A1* | 4/2010 | Hickey | | A45C 3/04 383/12 |
| 2010/0219219 A1* | 9/2010 | Svetina | | B62B 3/1464 224/411 |
| 2010/0320246 A1* | 12/2010 | Taylor | | A45C 3/04 224/411 |
| 2011/0198376 A1* | 8/2011 | Oh | | B62B 3/1464 224/411 |
| 2011/0220032 A1* | 9/2011 | Pendergrast | | A01K 61/54 119/201 |
| 2013/0048689 A1* | 2/2013 | Ling | | B62B 3/146 224/411 |
| 2014/0105589 A1* | 4/2014 | Samuels | | F16F 7/00 396/421 |
| 2014/0175140 A1* | 6/2014 | Folise | | A45F 4/02 224/583 |
| 2015/0076199 A1* | 3/2015 | Granvle | | B62B 3/1464 224/411 |
| 2015/0246751 A1* | 9/2015 | Spivack | | B65D 31/12 224/411 |
| 2016/0167689 A1* | 6/2016 | Haynes | | B62B 3/1464 224/411 |

* cited by examiner

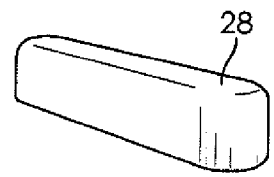
FIG. 7
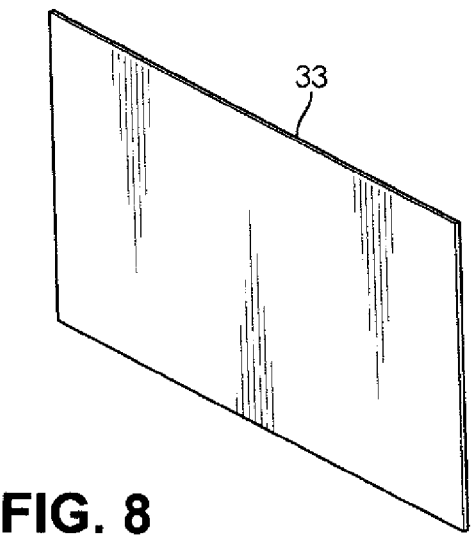
FIG. 8
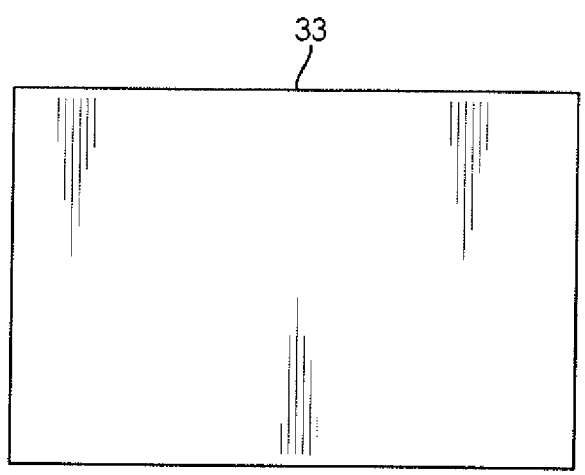 
FIG. 9  FIG. 10

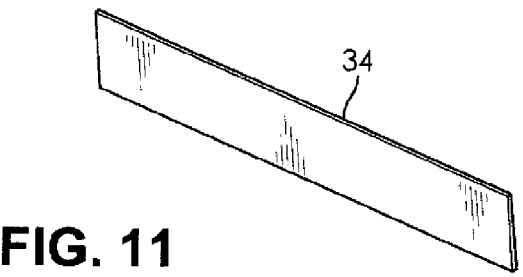
FIG. 11
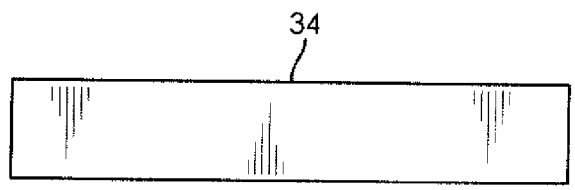
FIG. 12
FIG. 13
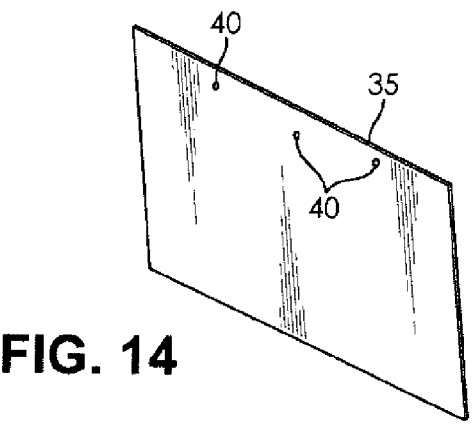
FIG. 14
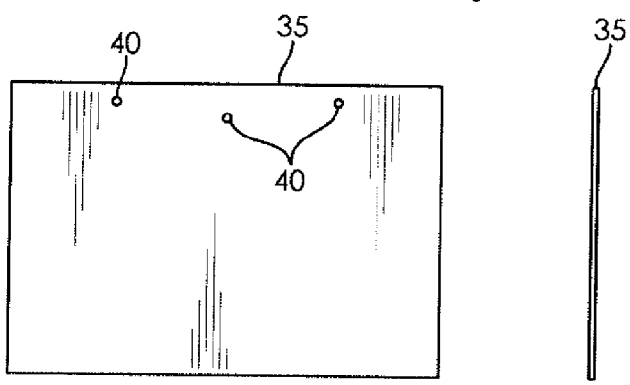
FIG. 15     FIG. 16

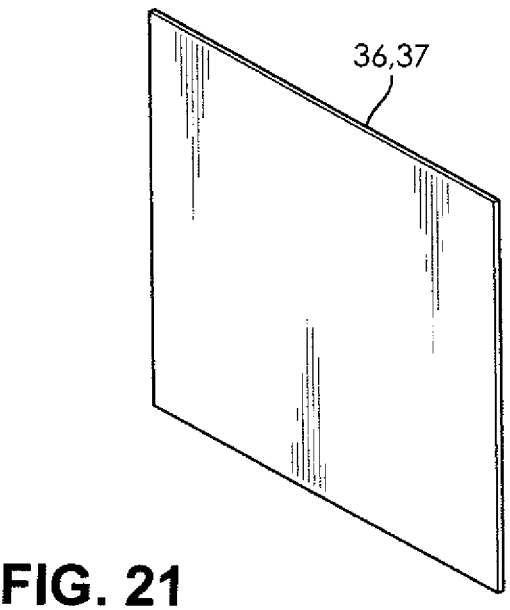
FIG. 21
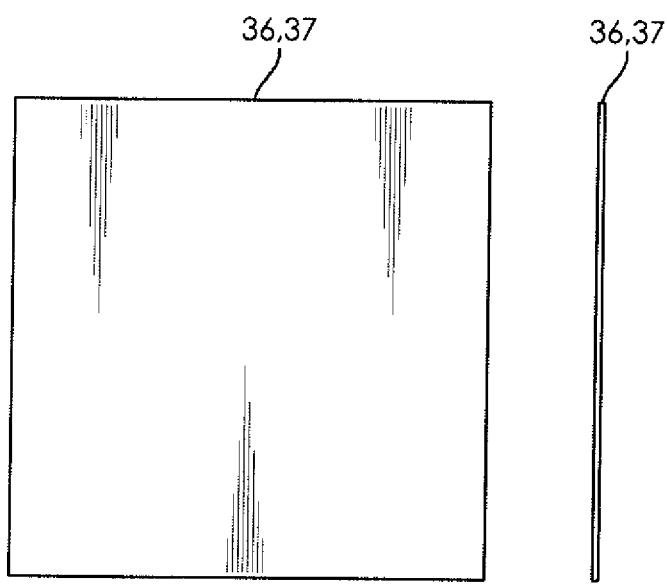 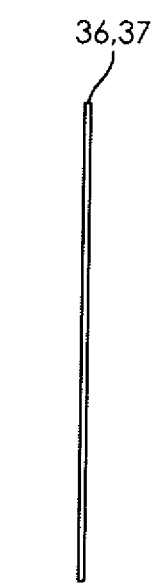
FIG. 22  FIG. 23

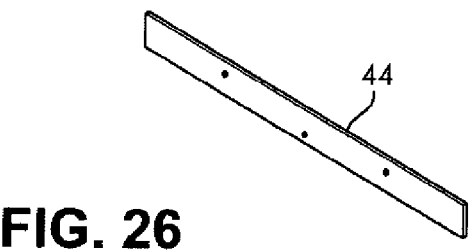
FIG. 26
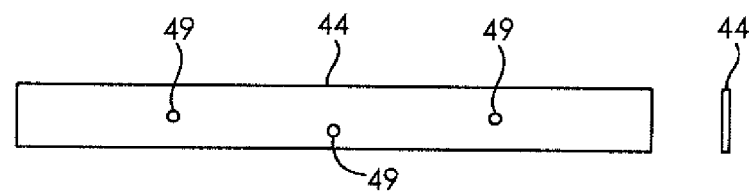
FIG. 27  FIG. 28
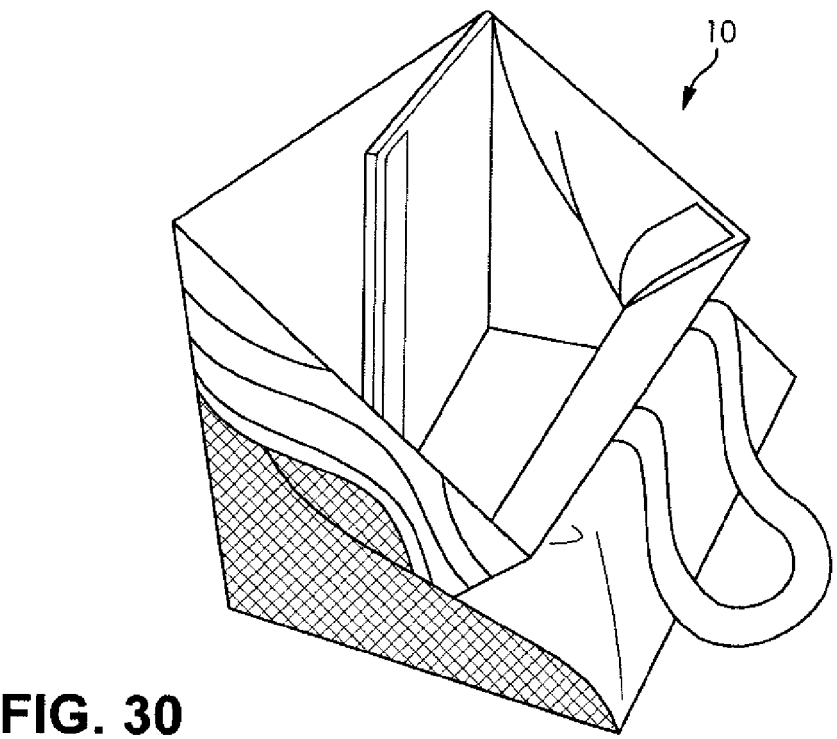
FIG. 30

COLLAPSIBLE STORAGE DEVICE FOR TEMPORARY ATTACHMENT TO A SHOPPING CART

CROSS-REFERENCE TO RELATED APPLICATIONS

This application claims the priority benefit of U.S. Provisional Patent Application No. 62/184,033 filed on Jun. 24, 2015 and U.S. Provisional Patent Application No. 62/209,953 filed on Aug. 26, 2015, the disclosures of which are each expressly incorporated herein in their entireties by reference.

STATEMENT REGARDING FEDERALLY SPONSORED RESEARCH

Not Applicable

PARTIES TO A JOINT RESEARCH AGREEMENT

Not Applicable

REFERENCE TO APPENDIX

Not Applicable

FIELD OF THE INVENTION

The field of the present invention generally relates to temporary attachments for shopping carts and, more particularly, to storage devices for temporary attachment to shopping carts that are configured to provide supplemental storage for items to be purchased while shopping and to provide means for carrying the items after purchase.

BACKGROUND OF THE INVENTION

Shopping carts have been in existence for many years in which shoppers can push the shopping carts through a store and place items to be purchased into the shopping carts. When ready to purchase the items, the shoppers can push the shopping carts to cashiers where the items are purchased and typically placed into paper or plastic bags so that they can be easily carried to their cars. The shopping carts are typically constructed of metal and/or plastic and typically have an open frame construction. While these shopping carts generally provide exemplary performance, they sometimes do not provide enough storage space. Particularly, if there is a need to have a small child ride in the shopping cart within the storage space. Additionally, small items can occasionally fall through the open structure of the shopping carts and fragile items can be damaged by other items when all placed within the shopping cart.

In an attempt to solve one or more of these problems, attachments have been developed to be attached to shopping carts for providing supplemental and separate storage spaces for items to be purchased. For example, see U.S. Pat. Nos. D484,666 and 7,475,885 the disclosures of which are expressly incorporated herein in their entireties by reference.

While these attempts may have provided improvements, they are bulky and thus are awkward to take to and from the store and/or they are not securely attached to the shopping carts. Accordingly, there is a need for improved storage devices for temporary attachment to shopping carts.

SUMMARY OF THE INVENTION

Disclosed are storage devices and methods for making and using the same which address one or more issues of the related art. Disclosed is a storage device for removable attachment to a shopping cart wherein the storage device comprises, in combination, a collapsible container having an interior storage space accessible through an upper opening, and an attachment assembly secured to the collapsible container and including at least one attachment for removably securing the collapsible container to the shopping cart.

Also disclosed is a storage device for removable attachment to a shopping cart wherein the storage device comprises, in combination, a collapsible container having an interior storage space accessible through an upper opening, an attachment assembly secured to the collapsible container and including a pair of hooks for removably securing the collapsible container to the shopping cart. The pair of hooks is removably and interchangeably secured to a first pair of spaced-apart predetermined attachment locations, and a second pair of spaced-apart predetermined attachment locations.

Also disclosed is a storage device for removable attachment to a shopping cart wherein the storage device comprises, in combination, a collapsible container having an interior storage space accessible through an upper opening and an attachment assembly secured to the collapsible container and including a first pair of hooks selectively and removably secured to the collapsible container for removably securing the collapsible container to the shopping cart, and a second pair of hooks interchangeable with the first pair of hooks and selectively and removably secured to the collapsible container for removably securing the collapsible container to the shopping cart. The second pair of hooks has a different size than the first pair of hooks.

From the foregoing disclosure and the following more detailed description of various preferred embodiments it will be apparent to those skilled in the art that the present invention provides a significant advance in the technology and art of methods for attachments for shopping carts. Particularly significant in this regard is the potential the invention affords for forming a collapsible storage device for a shopping cart that can be easily converted between an expanded or use configuration and a collapsed or storage configuration, and also for providing an attachment that securely and removably attaches the storage device to the shopping cart and can be utilized with a wide variety of different types of shopping carts. Additional features and advantages of various preferred embodiments will be better understood in view of the detailed description provided below.

BRIEF DESCRIPTION OF THE DRAWINGS

These and further features of the present invention will be apparent with reference to the following description and drawings.

FIG. 7 is a perspective view of a plastic bumper for the collapsible storage device of FIGS. 1 to 6.

FIG. 8 is a perspective view of a removable bottom support panel of the collapsible storage device of FIGS. 1 to 7.

FIG. 9 is top view of the bottom support panel of FIG. 8.

FIG. 10 is a left side view of the bottom support panel of FIGS. 8 and 9.

FIG. 11 is a perspective view of a front support panel of the collapsible storage device of FIGS. 1 to 7.

FIG. 12 is front view of the front support panel of FIG. 11.

FIG. 13 is a left side view of the front support panel of FIGS. 11 and 12.

FIG. 14 is a perspective view of a removable rear support panel of the collapsible storage device of FIGS. 1 to 7.

FIG. 15 is front view of the rear support panel of FIG. 14.

FIG. 16 is a left side view of the rear support panel of FIGS. 14 and 15.

FIG. 21 is a perspective view of a side support panel of the collapsible storage device of FIGS. 1 to 7.

FIG. 22 is front view of the side support panel of FIG. 21.

FIG. 23 is a left side view of the side support panel of FIGS. 21 and 22.

FIG. 26 is a perspective view of a front bar of the attachment assembly of the collapsible storage device of FIGS. 1 to 7.

FIG. 27 is a front view of the front bar FIG. 26.

FIG. 28 is a left side view of the front bar of FIGS. 26 and 27.

FIG. 30 is a front/right side perspective view of the collapsible storage device of FIGS. 1 to 7 as it is starting to be collapsed with the swinging side panels in a closed position.

Figure 2:
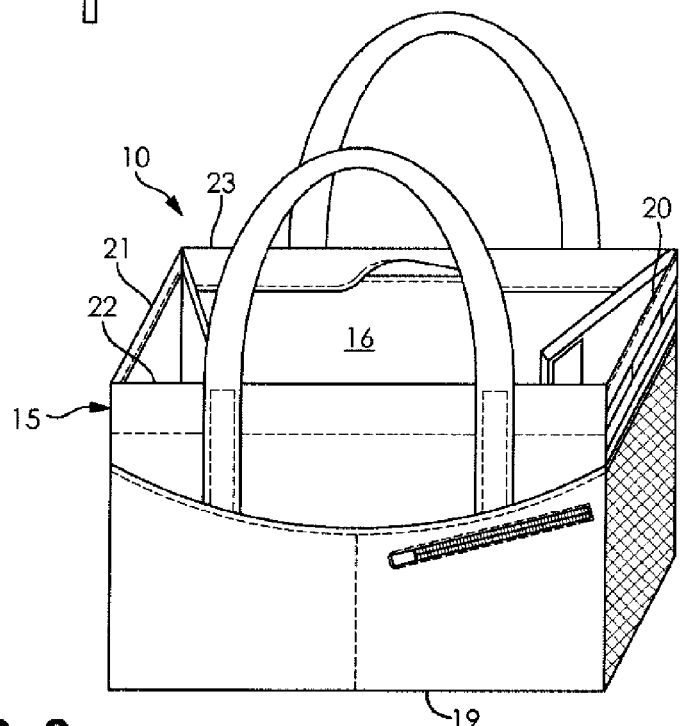
FIG. 2 is a front/left side perspective view of a collapsible storage device of FIG. 1, wherein several components are partially unsecured for clarity.

It should be understood that the appended drawings are not necessarily to scale, presenting a somewhat simplified representation of various preferred features illustrative of the basic principles of the invention. The specific design features of the collapsible storage devices as disclosed herein, including, for example, specific dimensions, orientations, locations, and shapes of the various components, will be determined in part by the particular intended application and use environment. Certain features of the illustrated embodiments have been enlarged or distorted relative to others to facilitate visualization and clear understanding. In particular, thin features may be thickened, for example, for clarity or illustration. All references to direction and position, unless otherwise indicated, refer to the orientation of the structures illustrated in the drawings. In general, up or upward generally refers to an upward direction within the plane of the paper in FIG. 2 and down or downward generally refers to a downward direction within the plane of the paper in FIG. 2. In general, front or forward generally refers to a direction out of the plane of the paper in FIG. 2 and rear or rearward generally refers to a direction into the plane of the paper in FIG. 2.

DETAILED DESCRIPTION OF CERTAIN PREFERRED EMBODIMENTS

It will be apparent to those skilled in the art, that is, to those who have knowledge or experience in this area of technology, that many uses and design variations are possible for the collapsible storage devices for shopping carts disclosed herein. The following detailed discussion of various alternative and preferred embodiments will illustrate the general principles of the invention with regard to collapsible storage devices for grocery-type shopping carts. Other embodiments suitable for other applications will be apparent to those skilled in the art given the benefit of this disclosure.

Figure 1:
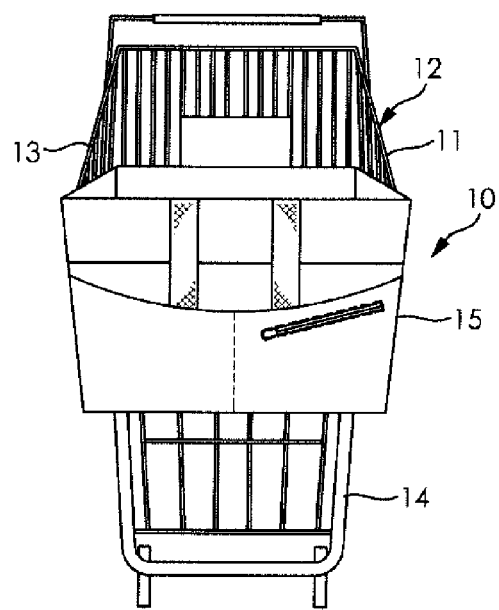
FIG. 1 is a front perspective view of a shopping cart with a collapsible storage device according to the present invention temporarily attached to a front thereof.

Referring now to the drawings, FIG. 1 shows a collapsible storage device 10 according to the present invention temporarily attachment to the front of a shopping cart 11. The illustrated shopping cart 11 can has a wire frame construction. The illustrated shopping cart 11 is a standard shopping cart used in grocery and other retail stores but the shopping cart 11 can be of any other suitable type. The illustrated shopping cart 11 includes a storage basket or compartment 12 having a bottom wall, a front wall extending upward from the bottom wall, a rear wall opposed to the front wall and extending upward from the bottom wall, and opposed left and right side walls extending upward from the bottom wall and connecting the front and rear walls. The tops of the illustrated front, rear, and side walls of the basket form a rectangular-shaped rim 13 defining a top opening so that items can be placed into and removed from the interior space of the storage basket 12. The illustrated storage basket 12 is formed by metal but can alternatively be formed by any other suitable material such as, for example, a plastic material. The illustrated shopping cart 11 also includes a storage shelf 14 located below the storage basket 12 and has four wheels so that the shopping cart 12 can be pushed at a handle located at a rear of the shopping cart to make the shopping cart roll along the floor as items to be purchased are placed in the storage basket 12. It is noted that any other suitable shopping cart 11 such as a plastic shopping cart, or a child's shopping cart or other types of vehicles such as a motorized cart or a child's car cart can alternatively be utilized.

As seen in FIGS. 2 to 6, the illustrated collapsible storage device 10 includes a collapsible container 15 having an interior storage space 16 accessible through an upper opening, and an attachment assembly 17 having at least one attachment 18 for removably securing the collapsible container 15 to the shopping cart 11. The collapsible container 15 is configured to be converted between an extended or use configuration (shown in FIGS. 2 to 5) and a collapsed or storage configuration (shown in FIGS. 31 and 32) which occupies less storage space than the extended position.

The illustrated collapsible container 15 is in the form of a rectangular-shaped tote bag having a base or bottom wall 19, left and right side walls 20, 21 extending up from left and right side edges of the bottom wall 19 respectively, and front and rear walls 22, 23 extending up from front and rear edges of the bottom wall 19 respectively and connecting the left and right side walls. The walls 19, 20, 21, 22, 23 form the interior storage space 16 accessible through the upper opening so that items can be placed into and taken out of out of the interior space 16 through the opening. The illustrated front and rear walls 22, 23 have a length greater than the length of the side walls 20, 21 and are sized to fit on the front of a standard shopping cart 11 so that the collapsible container 15 does not substantially increase the lateral size of the shopping cart 11. That is, the collapsible container 15 preferably does not extend past the sides of the shopping cart 11 when attached to the front of the shopping cart 11. The illustrated walls 20, 21, 22, 23 each have a height sized so that the side walls 20, 21 are substantially square. That is, the height of the walls 20, 21, 22, 23 is substantially the same as the width of the side walls 20, 21. A suitable size for the collapsible container 15 for use with a standard shopping cart 11 is believed to be about 17.5 inches (length of front and rear walls 22, 23) by about 12 inches (length of left and right side walls 20, 21) by about 12 inches (height of each of the walls 20, 21, 22, 23) but any other suitable size can alternatively be utilized. The illustrated bottom, side, front, and rear walls 19, 20, 21, 22, 23 are each formed of a non-rigid fabric sewn together with thread but any other suitable material and/or construction can alternatively be utilized. The non-rigid or flexible fabric enables the collapsible container 15 to be collapsed to the collapsed or storage configuration as describe in more detail hereinafter. A suitable fabric is believed to be coated poly nylon but any other suitable type of fabric can alternatively be utilized. A suitable thread is believed to be poly wrap poly core DTM but any other suitable type of thread can alternatively be utilized.

Figure 3:
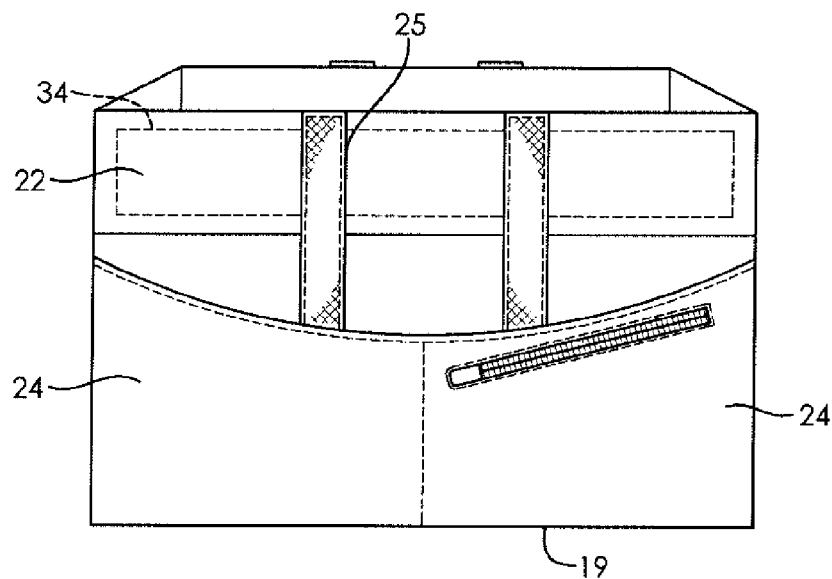
FIG. 3 is a front view of the collapsible storage device of FIGS. 1 and 2.

As best shown in FIG. 3, the outer side of the illustrated front wall 22 is provided with a pair of side-by-side equal-sized pockets 24 each having a top access opening. The illustrated pockets 24 together extend the entire length of the front wall 22 from side seam to side seam with the left and right side walls 20, 21 and extend upward from the bottom seam with the bottom wall 19 for more than half of the height of the front wall 22. The illustrated pockets 24 are formed of fabric material matching the front wall 22. The access opening of the illustrated left front pocket 24 is provided with a zipper to selectively open and close the access opening. The illustrated front wall 22 is also provided with a loop handle 25 upwardly extending from the top of the front wall 22. The illustrated loop handle 25 is formed of a strap or web that has each end vertically extending the entire height of the front wall in a spaced-apart manner and forming the loop therebetween above the front wall 22 for grasping by the user. The strap can be a nylon strap or web having a width of about 1.25 inches but any other suitable material and/or size can alternatively be utilized. It is noted that the pockets 24 and the loop handle 25 each can alternatively have any other suitable configuration or can be eliminated if desired.

Figure 4:
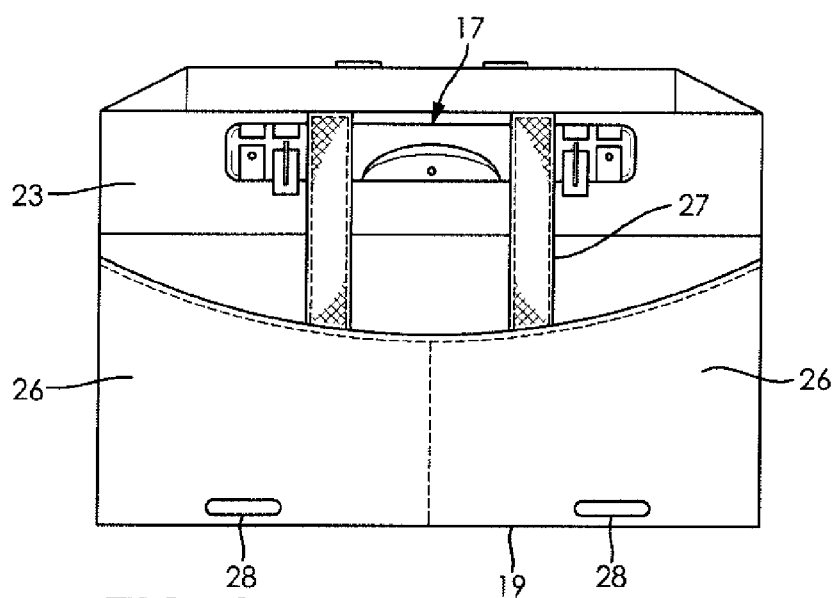
FIG. 4 is a rear view of the collapsible storage device of FIGS. 1 to 3.

As best shown in FIG. 4, the outer side of the illustrated rear wall 23 is provided with a pair of side-by-side equal-sized pockets 26 each having a top access opening. The illustrated pockets 26 together extend the entire length of the rear wall 23 from side seam to side seam with the left and right side walls 20, 21 and extend upward from the bottom seam with the bottom wall 19 for more than half of the height of the rear wall 23. The illustrated pockets 26 are formed of fabric material matching the rear wall. The illustrated rear wall 23 is also provided with a loop handle 27 upwardly extending from the top of the rear wall 23 opposite the loop handle 25 of the front wall 22. The illustrated rear loop handle 26 is formed of a strap or web that has each end vertically extending the entire height of the rear wall 23 in a spaced-apart manner and forming the loop therebetween above the rear wall 23 for grasping by the user. The strap can be a nylon strap or web having a width of about 1.25 inches but any other suitable material and/or size can alternatively be utilized. It is noted that the pockets 26 and the loop handle 27 each can alternatively have any other suitable configuration or can be eliminated if desired.

The upper end of the illustrated rear wall 23 is also provided with the attachment assembly 17 as described in more detail hereinafter. The lower end of the illustrated rear wall 23 is also provided with a pair of laterally spaced-apart bumpers 28. The illustrated bumpers 28 are shown in more detail in FIG. 7. The illustrated bumpers 28 are sized and shaped to space the lower end of the rear wall 23 from the shopping cart 11 when the collapsible container 15 is hanging from the front upper edge of the shopping cart basket 12 via the attachment assembly 17 in order to prevent noise and/or damage otherwise due to contact therebetween. The illustrated bumpers 28 on the rear wall 23 are formed of plastic but any other suitable material can alternatively be utilized. It is noted that the bumpers 28 on the rear wall 23 can alternatively have any other suitable configuration or location.

Figure 32:
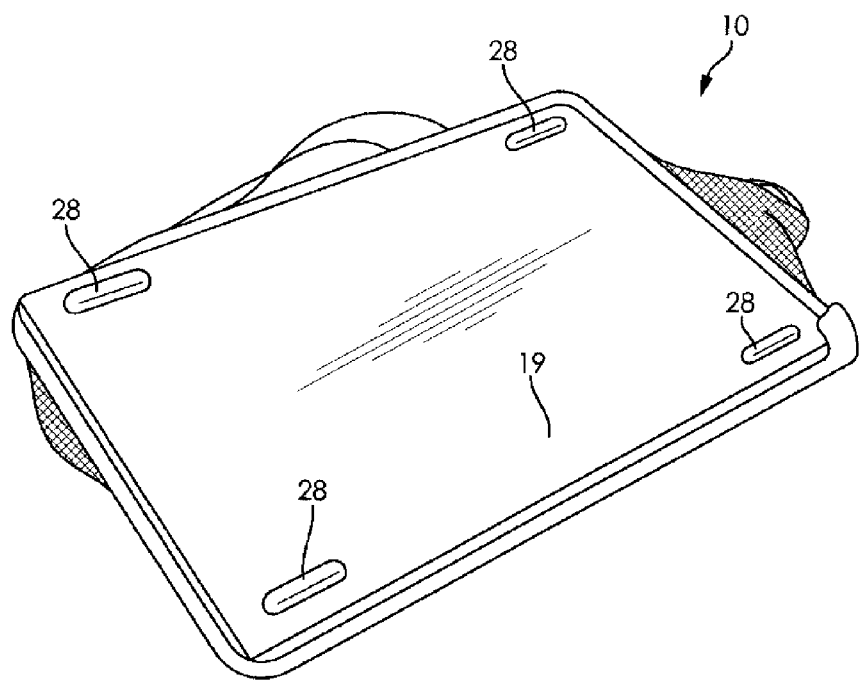
FIG. 32 is a bottom perspective view of the collapsible storage device of FIGS. 1 to 7 in the collapsed or storage configuration.
Figure 33:
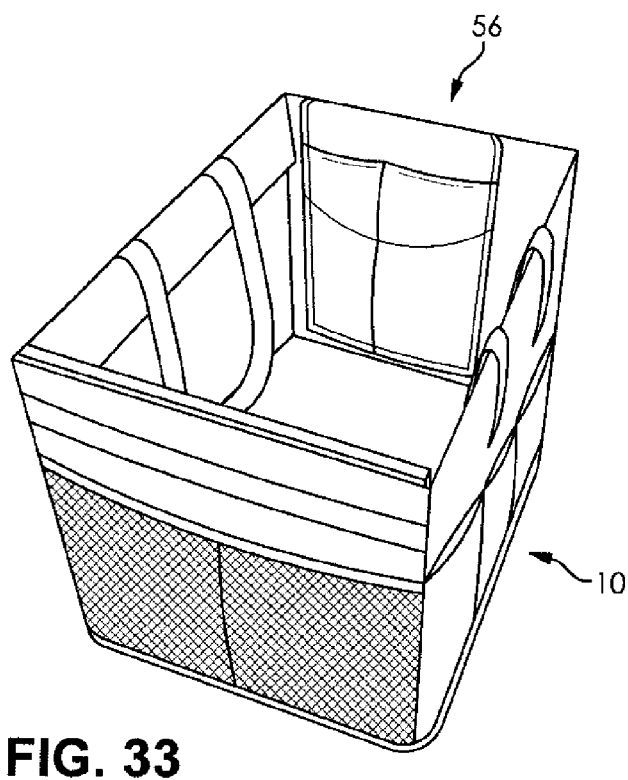
FIG. 33 is a front/right perspective view of the collapsible storage device of FIGS. 1 to 7 with a removable accessory pouch.
Figure 36:
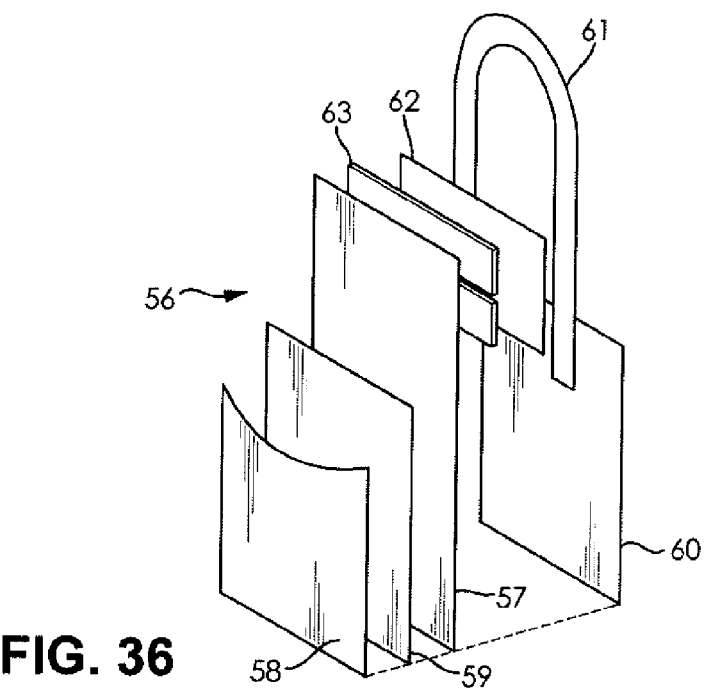
FIG. 36 is an exploded perspective view of the removable accessory pouch of FIGS. 33 to 35.
Figures 34, 35:
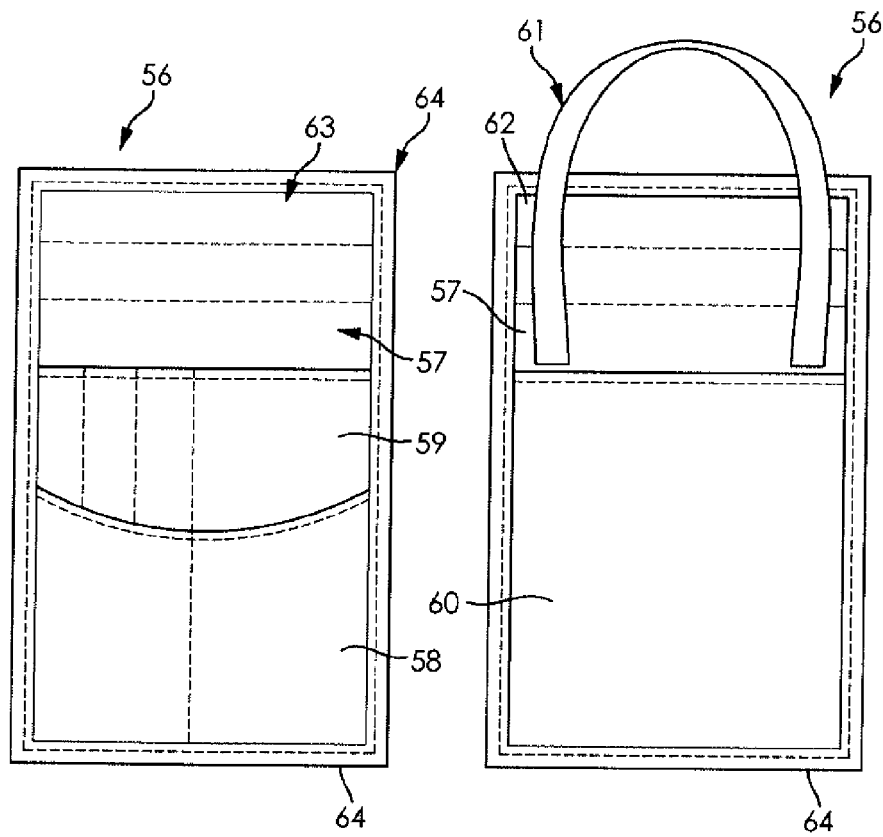
FIG. 34 is a front view of the removable accessory pouch of FIG. 33.
FIG. 35 is a rear view of the removable accessory pouch of FIGS. 33 and 34.
Figure 37:
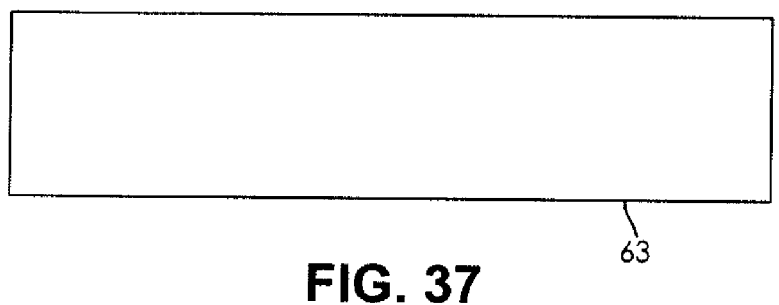
FIG. 37 is a front view of a panel insert of the removable accessory pouch of FIGS. 33 to 36.

The lower or outer side of the illustrated bottom wall 19 is also provided with four of the bumpers 28 (best seen in FIG. 32). The illustrated bumpers 28 on the bottom wall 19 are located near the four corners of the bottom wall 19. The illustrated bumpers 28 are sized and shaped to space the bottom wall 19 from a support surface when the collapsible container 15 is sitting on a support surface such as the ground or the floor of an automotive trunk in order to prevent damage otherwise due to contact therebetween. The illustrated bumpers 28 on the bottom wall 19 are formed of plastic but any other suitable material can alternatively be utilized. It is noted that the bumpers 28 on the bottom wall 19 can alternatively have any other suitable configuration and/or location.

Figure 5:
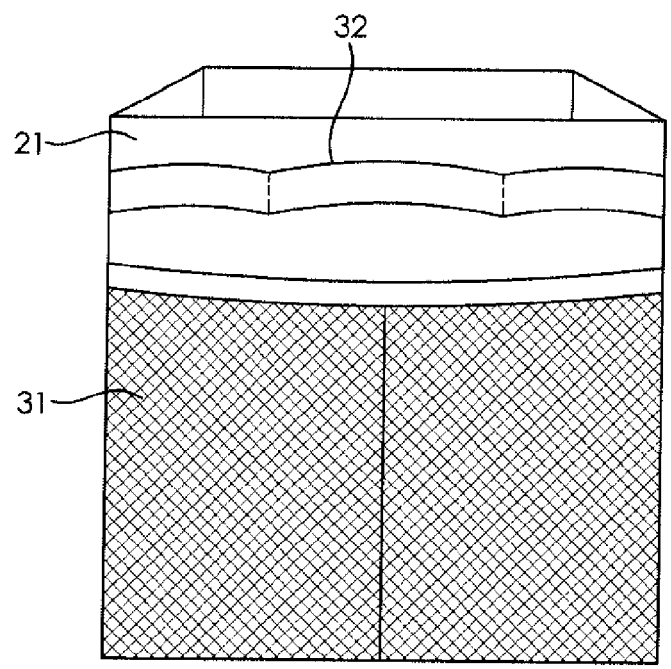
FIG. 5 is a left side view of the collapsible storage device of FIGS. 1 to 4.

As best shown in FIG. 5, the outer side of the illustrated left side wall 20 is provided with a pocket 29 having a top access opening. The illustrated pocket 29 extends the entire length of the left side wall 20 from side seam to side seam with the front and rear walls 22, 23 and extends upward from the bottom seam with the bottom wall 19 for more than half of the height of the left side wall 20. The illustrated pocket 29 on the left side wall 20 is formed of mesh material with the top edge at the access opening being provided with a binding of folded elastic. The upper end of the outer side of the illustrated left side wall 20 is provided with a horizontally-extending strap handle 30. The illustrated strap handle 30 is formed of a strap or web that horizontally extends the entire length of the left side wall 20 from side seam to side seam with the front and rear walls 22, 23 and includes a pair of spaced-apart vertical seams stitching the strap to the side wall between the side seams to form a centrally located loop opening for grasping by the user. The strap can be a nylon strap or web having a width of about 2 inches but any other suitable material and/or size can alternatively be utilized. It is noted that the pocket 29 and the strap handle 30 each can alternatively have any other suitable configuration or can be eliminated if desired.

Figure 6:
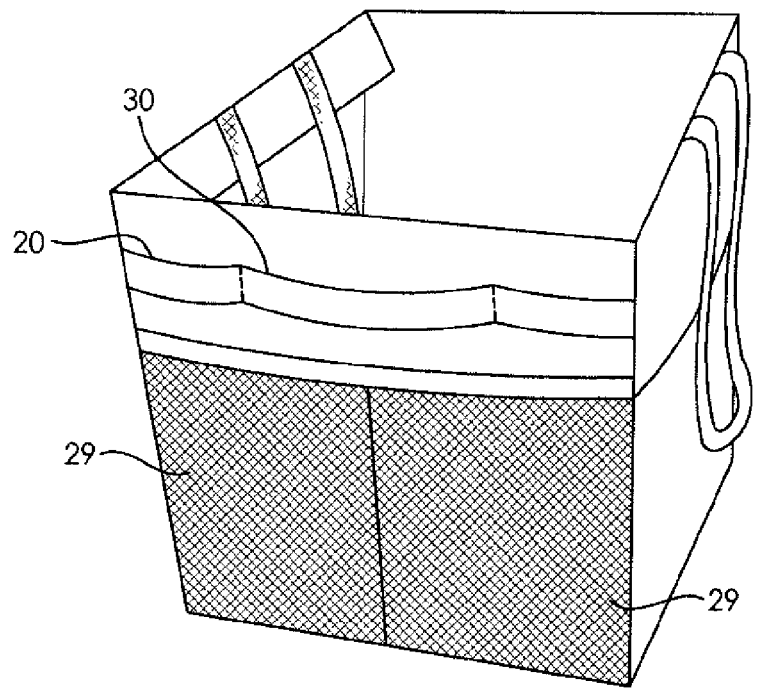
FIG. 6 is a right side view of the collapsible storage device of FIGS. 1 to 5.
Figure 17:
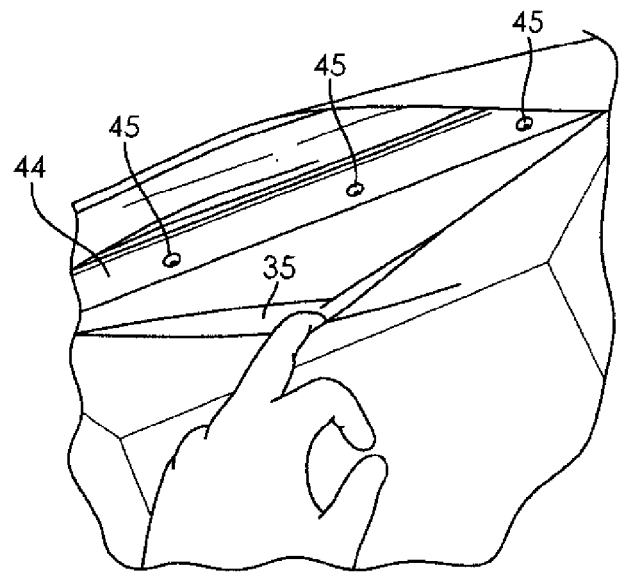
FIG. 17 is an enlarged, fragmented rear/right side perspective view of the collapsible storage device of FIGS. 1 to 7 showing an interior pocket of the rear wall for a removable rear support panel.
Figure 18:
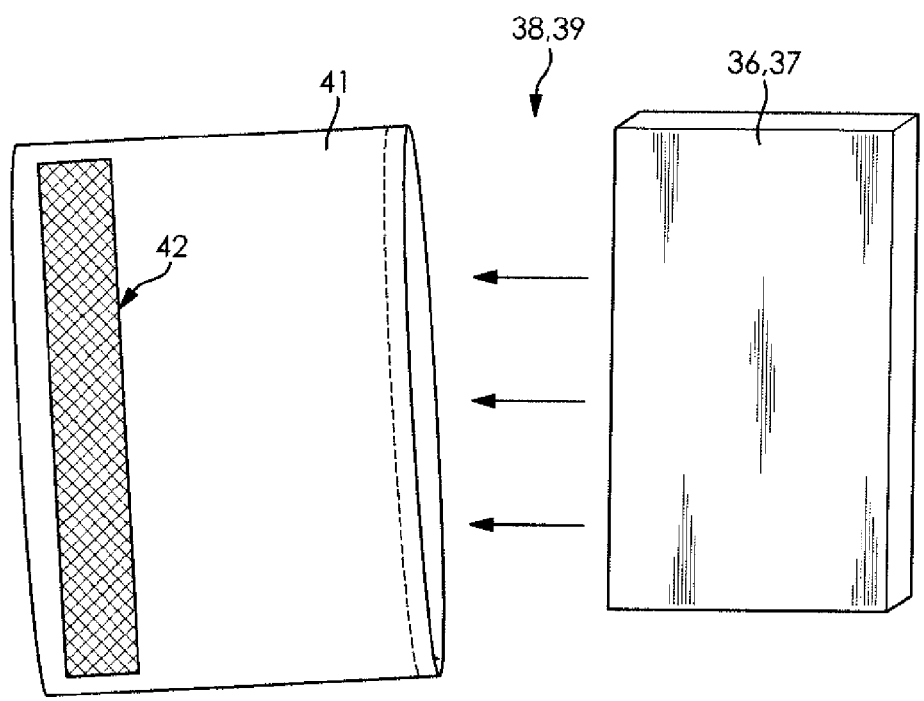
FIG. 18 is an exploded view of a swinging or hinged side support wall and side support panel of the collapsible storage device of FIGS. 1 to 7.
Figure 19:
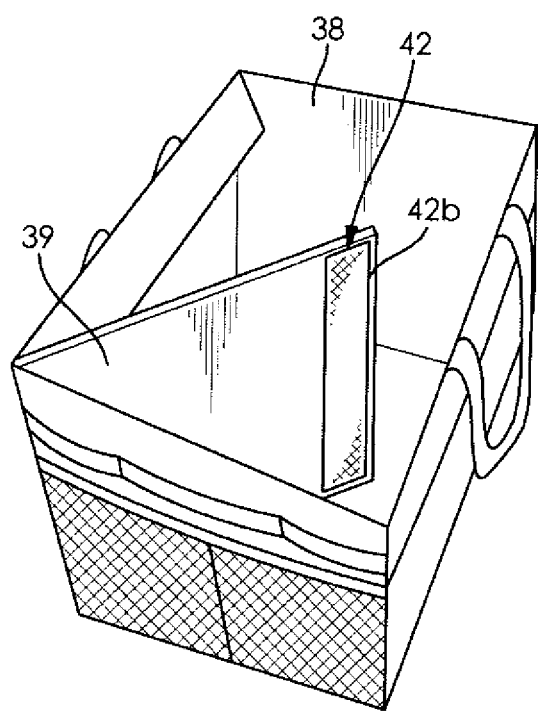
FIG. 19 is a front/right side perspective view of the collapsible storage device of FIGS. 1 to 7 showing the swinging or hinged side support wall positioned between use and storage positions.
Figure 20:
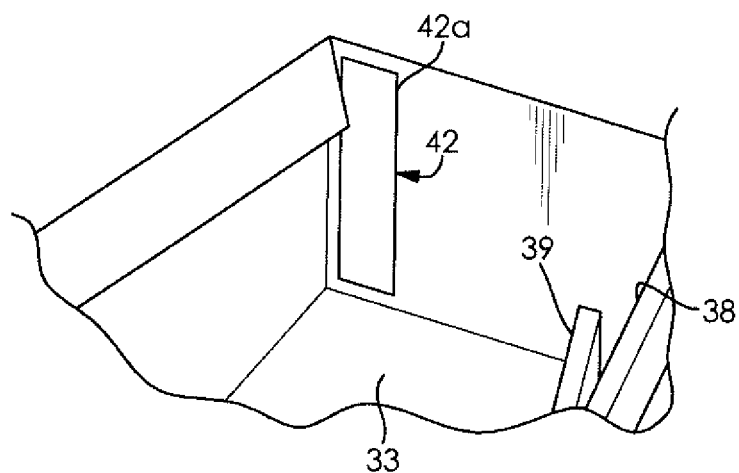
FIG. 20 is an enlarged, fragmented rear/left side perspective view of the collapsible storage device of FIGS. 1 to 7 showing the swinging or hinged side support walls in their storage positions and a fastener for removably securing the swinging or hinged side support wall in its use position.
Figure 24:
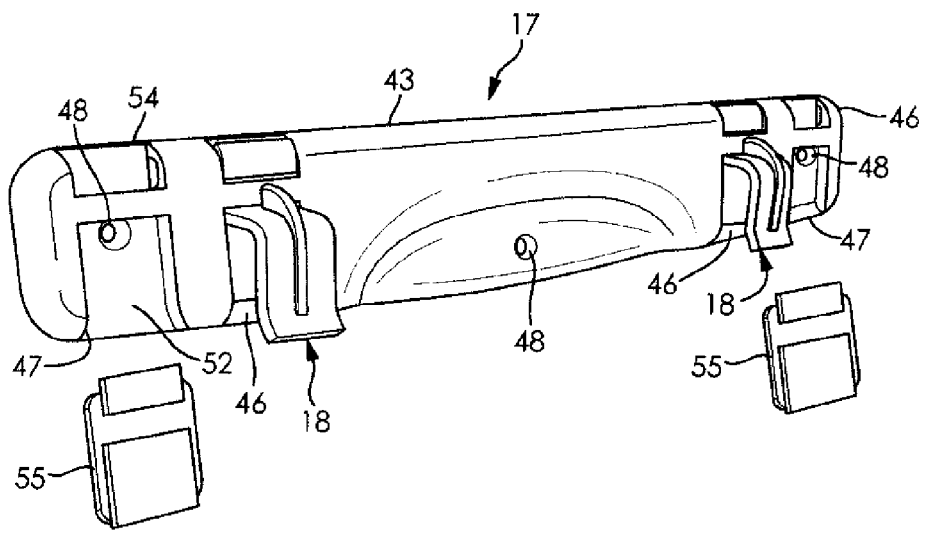
FIG. 24 is a partially exploded rear/left side perspective view of part of the attachment assembly of the collapsible storage device of FIGS. 1 to 7.

As best shown in FIG. 6, the outer side of the illustrated right side wall 21 is provided with a pair of side-by-side equal-sized pockets 31 each having a top access opening. The illustrated pockets 31 together extend the entire length of the left side wall 21 from side seam to side seam with the front and rear walls 22, 23 and extend upward from the bottom seam with the bottom wall 19 for more than half of the height of the right side wall 21. The illustrated pockets 31 are formed of mesh material with each of the top edges at the access openings being provided with a binding of folded elastic. The upper end of the outer side of the illustrated right side wall 21 is provided with a horizontally-extending strap handle 32 opposite the strap handle 30 on the left side wall 20. The illustrated right strap handle 32 is formed of a strap or web that horizontally extends the entire length of the right side wall 21 from side seam to side seam with the front and rear walls 22, 23 and includes a pair of spaced-apart vertical seams stitching the strap to the right side wall 21 between the side seams to form a centrally located loop opening for grasping by the user. The strap can be a nylon strap or web having a width of about 2 inches but any other suitable material and/or size can alternatively be utilized. It is noted that the pockets 31 and the handle 32 each can alternatively have any other suitable configuration or can be eliminated if desired.

Because the walls 19, 20, 21, 22, 23 of the illustrated collapsible container 15 are each formed of a non-rigid fabric, rigid support panels 33, 34, 35, 36, 37 are provided so that the collapsible container 15 will stay in the extended or use configuration when desired. That is, the collapsible container 15 will be self-supporting in the extended or use configuration. The illustrated rigid support panels 33, 34, 35, 36, 37 include a bottom support panel 33 that supports the bottom wall 19, a front support panel or strip 34 that supports the top edge of the front wall 22, a rear support panel 35 that supports the rear wall 23, and left and right side support panels 36, 37 located in swinging or hinged side support walls 38, 39 that selectively support the left and right side walls 20, 21 respectively.

As best shown in FIGS. 20, and 8 to 10, the illustrated bottom support panel 33 removably lays on top of the inner or top side of the bottom wall 19 so that it is supported by the bottom wall 19. The illustrated bottom support panel 33 is sized and shaped to substantially engage and support the entire inner or top side of the bottom wall 19. The illustrated bottom support panel 33 has length of about 17.75 inches, a width of about 11.75 inches and a thickness of about 0.13 inches but any other suitable size can alternatively be utilized. The illustrated bottom support panel 33 is in the form of a rigid panel or board such as, for example, a plastic board. The plastic board can comprise polyethylene or any other suitable material. The bottom support panel 33 can be provided with an outer covering if desired. The outer covering can be in the form of fabric sewn together to form an inner cavity for the inner support. The outer covering can be sewn together such that the inner panel is not removable from the outer covering but could alternatively be of any other suitable configuration. The fabric of the outer covering can match the fabric of the bottom wall 19 of the container. It is noted that the bottom support panel 33 can alternatively have any other suitable configuration.

As best shown in FIGS. 3 and 11 to 13, the illustrated front support strip 34 is irremovably held within a closed pocket or cavity located at the top of the front wall 22. The illustrated front support strip 34 is sized and shaped to substantially support the upper edge of the front wall 22. The illustrated front support strip 34 has length of about 17.75 inches, a height of about 3 inches and a thickness of about 0.13 inches but any other suitable size can alternatively be utilized. The illustrated front support strip 34 is in the form of a rigid panel or board such as, for example, a plastic board. The plastic board can comprise polyethylene or any other suitable material. The illustrated closed pocket is in the form of fabric sewn to form an inner cavity of suitable size and shape for the front support strip. The fabric of the closed pocket can be the same fabric as used for the front wall. It is noted that the front support strip 34 can alternatively have any other suitable configuration.

As best shown in FIGS. 14 to 17, the illustrated rear support panel 35 is removably held within a pocket located at the inner side of the rear wall 22. The illustrated rear support panel 35 is sized and shaped to substantially support the entire rear wall. The illustrated rear support panel 35 has length of about 17.38 inches, a height of about 11.75 inches and a thickness of about 0.13 inches but any other suitable size can alternatively be utilized. The illustrated rear support panel 35 is in the form of a rigid panel or board such as, for example a plastic board. The plastic board can comprise polyethylene or any other suitable material. The illustrated rear support panel 35 is provided with a plurality of fastener openings 40 which cooperate with the attachment assembly 17 as describe in more detail hereinafter. The illustrated pocket has a top opening for insertion and removal of the rear support panel 35 into and out of the pocket. A flap is provided above the illustrated pocket for covering the top opening. The illustrated pocket is formed by the rear wall having two fabric panels sewn together at the bottoms and side edges to form an inner cavity or space for the rear support panel. The illustrated flap is also in the form of fabric. The fabric of the pocket and the flap can be the same fabric as used for the rear wall. It is noted that the rear support panel 35 and the pocket each can alternatively have any other suitable configuration.

As best shown in FIGS. 18 to 23, the illustrated left and right swinging or hinged side support walls 38, 39 are pivotally or hingedly attached to the collapsible container 15 at the side seam or corner between the rear wall 23 and the left and right side walls 20, 21 respectively. Attached in this manner the left swinging side support 38 wall pivots 90 degrees about a vertical axis at the corner between a use position adjacent the left side wall 20 to support the left side wall 20 and a storage position adjacent the rear wall 23 to permit the left side wall 20 to be collapsible, that is, the non-rigid or flexible left side wall 20 can be folded. Likewise, the right swinging side support wall 39 pivots 90 degrees about a vertical axis at the corner between a use position adjacent the right side wall 21 to support the right side wall 21 and storage position adjacent the rear wall 23 to permit the right side wall 21 to be collapsible, that is, the non-rigid or flexible right side wall 21 can be folded. Each of the illustrated swinging or hinged side support walls 38, 39 includes an outer covering 41 and the support panel 36, 37 located with the outer covering 41. The illustrated outer covering 41 is in the form of fabric panels sewn together to form an inner cavity or space for holding the support panel 36, 37. The fabric can match the fabric of the rear and side walls of the container. The illustrated outer covering is sewn closed such that the side support panel is not removable from the outer covering but could alternatively be of any other suitable configuration. The illustrated outer covering 41 is sewn into the side seam of the collapsible container 15 between the rear wall 23 and the respective one of the left and right side walls 20, 21 to form the pivot or hinge for the swinging support walls 38, 39 but could alternatively be pivotably attached in any other suitable manner. It is noted that the swinging support walls 38, 39 can alternatively have any other suitable configuration.

Fasteners 42 are provided between the left and right swinging side support walls 38, 39 and the left and right side walls 20, 21 respectively to removably secure each of the swinging side support walls 38, 39 to their respective side wall 20, 21 when the side support walls 38, 39 are in their use position and the collapsible container 15 is in the extended or use configuration. The illustrated fasteners 42 are strips of hook and loop fasteners such as, for example, Velcro but any other suitable removable fastener can alternatively be utilized such as, for example, snaps, buttons, magnets, and the like. The illustrated strips of hook material 42a are secured along the inner side of the left and right side walls 20, 21 near the side seams with the front wall 22 and the illustrated strips of loop material 42b are secured along the free edge of the swinging support walls 38, 39 opposite the pivots on the sides facing the side walls 20, 21 when in their use positions to engage the strips of hook material 42a. It is noted that the hook and loop strips 42a, 42b can be reversed if desired and any other suitable type of removable fastener can alternatively be utilized.

The illustrated side support panels 36, 37 are sized and shaped to substantially engage and support the entire inner side of the side walls 20, 21. The illustrated side support panels 36, 37 each have a length of about 11.75 inches, a height of about 11.75 inches, and a thickness of about 0.13 inches but any other suitable size can alternatively be utilized. The illustrated side support panels 36, 37 are in the form of a rigid panel or board such as, for example, a plastic board. The plastic board can comprise polyethylene or any other suitable material. It is noted that the side support panels 36, 37 each can alternatively have any other suitable configuration.

As best shown in FIGS. 4, 17, and 24 to 27, the illustrated attachment assembly 17 includes an attachment bracket 43 secured to the collapsible container 15, a front bar 44 opposite the attachment bracket 43 and secured to the collapsible container 15, a plurality of mechanical fasteners 45 extending between the attachment bracket 17 and the front bar 44 and securing the attachment bracket 17 to the rear wall 23 of the collapsible container 15, and the at least one attachment 18 removably secured to the attachment bracket 17 for removably securing the collapsible storage device 10 to the shopping cart 11. The illustrated at least one attachment 18 is in the form of a pair of laterally spaced-apart, downward-facing hooks. The illustrated hooks are configured so that they can be placed over the top edge of the front wall of the shopping cart basket 12 to support the collapsible container 15 from the top edge of the storage basket 12 in front of the storage basket 12 as best seen in FIG. 1. It is noted that the at least one attachment 18 can alternatively have any other suitable configuration.

The illustrated attachment bracket 43 is generally elongate and is secured to the collapsible container 15 near the top edge of the rear wall 23 of the collapsible container 15. The illustrated attachment bracket 43 is formed of a plastic material but any other suitable material can alternatively be utilized. The illustrated attachment bracket 43 has a first pair of laterally spaced-apart hook locations 46 and a second pair of laterally spaced-apart hook locations 47 that are spaced-apart a greater distance than the first pair of hook locations 46. Having a plurality of predetermined pairs of hook locations 45, 45 enables the user to select the most desirable spacing for the pair of hooks 18 for a particular shopping cart 11. The illustrated attachment bracket 43 also has a plurality of fastener openings 48 for receiving the mechanical fasteners 45. The illustrated attachment bracket 43 has three fastener openings 48 with one of the fastener openings 48 centrally located and two of the fasteners openings 48 located at the second pair of hook locations 47. It is noted that the attachment bracket 43 can alternatively have any other suitable configuration.

The illustrated front bar 44 is sized and shaped to cooperate with the attachment bracket 43 and extend along the attachment bracket 43 on the inner side of the container rear wall 23. The illustrated front bar 44 has a length of about 17.38 inches, a height of about 1.50 inches and a thickness of about 0.13 inches but any other suitable size and shape can alternatively be utilized. The front bar 44 is preferably formed of a rigid material such as, for example, aluminum 6061 and the like. The illustrated front bar 44 also has a plurality of fastener openings 49 configured to cooperate with the plurality of fastener openings 48 in the attachment bracket 43. It is noted that the front bar 44 can alternatively have any other suitable configuration.

The illustrated attachment bracket 43 is secured to the rear wall 23 by the plurality of mechanical fasteners 45 that extend through attachment bracket 43, the container rear wall 23, the rear support panel 35, and the front bar 44. The illustrated mechanical fasteners 45 are threaded bolts and nuts with the nuts locate within the pocket of the container rear wall 23. With the mechanical fasteners 45 tightened, the container rear wall 23 and the rear support panel 35 are clamped between the attachment bracket 43 and the front bar 44. It is noted that the attachment bracket 43 can alternatively be secured to the collapsible container in any other suitable manner.

The illustrated hooks 18 are configured to be removably secured to the attachment bracket 43 with snap lock connections so that the hooks 18 can be easily snapped into and out of connection with the attachment bracket 43 at one of the pairs of hook locations 46, 47. The illustrated hooks 18 each include base portion 50 configured to cooperate with the hook location 46, 47 of the attachment bracket 43 and a hook portion 51 rearwardly extending from the base portion 50 configured to be placed over the rim 13 of the shopping basket 12 to support the collapsible container 15 from the rim 13 of the shopping basket 12 in front of the shopping basket 12. The illustrated hook portion 51 is downward-facing having a first portion horizontally extending from the base portion in a rearward direction and a second portion downwardly extending from the rear end of the first portion. The illustrated base portion 50 is generally rectangular shaped and is sized to be received within a vertically extending slot 52 in the attachment bracket 43 at the hook locations 46, 47. The illustrated base portion 50 also has a tab 53 located at the top of the rear side of the base portion 50 and spaced above the hook portion 51. The tab 53 is sized and shaped to be located above a laterally extending bar 54 located within the slot 52 of the attachment bracket 43. Configured in this manner, when the hook base portion 50 is resiliently snapped into the slot 52 of the attachment bracket 43 in an upward direction, a downward facing abutment formed by the bottom of the tab 53 of the base portion 50 engages an upward facing abutment formed by the top of the bar 54 of the attachment bracket 43. Also, an upward facing abutment formed by the top of the first portion of the hook portion 51 engages a downward facing abutment formed by the bottom of the bar 54 of the attachment bracket 43. The illustrated hook portion 51 also forms a forward facing abutment that engages a rearward facing abutment formed by the rearward side of the bar 54. Secured in this manner, the hook 18 is secured to the attachment bracket 43 against both upward and downward relative movement and forward and rearward relative movement between the hook 18 and the attachment bracket 43. The illustrated hooks 18 are formed of a plastic material but any other suitable material can alternatively be utilized. It is noted that the hooks 18 can alternatively have any other suitable configuration.

The illustrated attachment assembly 17 also includes a pair of covers or inserts 55 that can be removably secured to the unused pair of hook locations 46, 47 with a snap lock connection similar to the hooks 18. The illustrated covers 55 are configured like the base portion 50 of the hooks 18. That is, configured like the hooks 18 without the hook portions 51. The illustrated covers 55 are formed of a plastic material but any other suitable material can alternatively be utilized. It is noted that the covers 55 can alternatively have any other suitable configuration.

Figure 29:
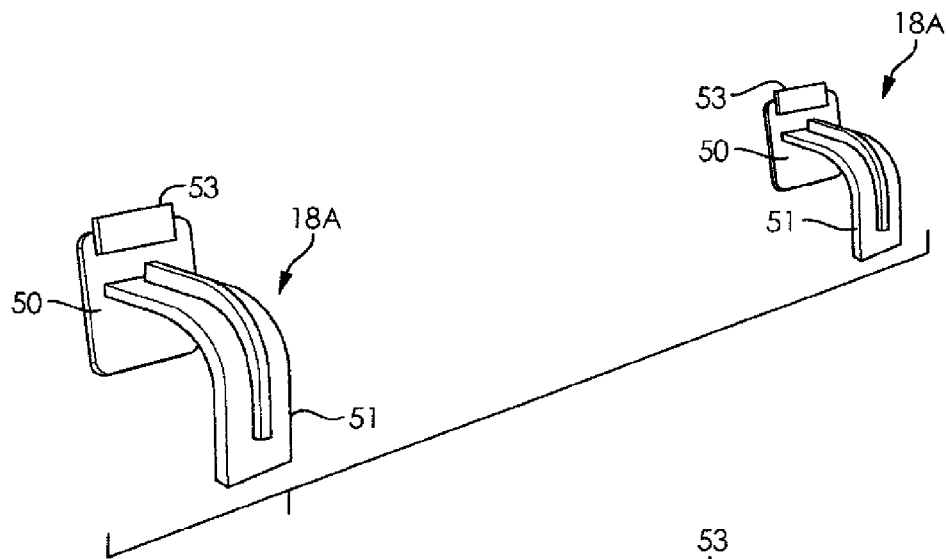
FIG. 29 is a perspective view of a second pair of hooks for the of the attachment assembly of the collapsible storage device of FIGS. 1 to 7.
Figure 25:
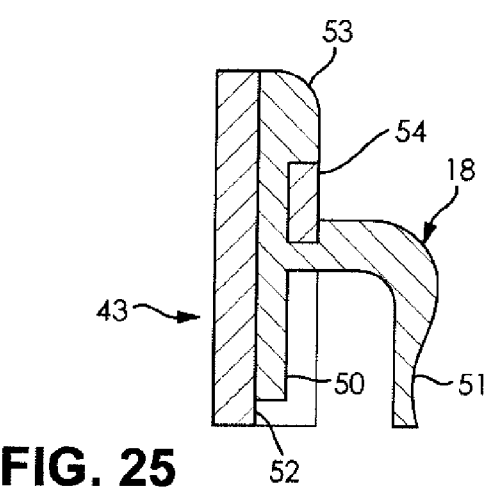
FIG. 25 is a fragmented cross sectional view showing the interface between the attachment bracket and the hooks of the attachment assembly of the collapsible storage device of FIGS. 1 to 7.

As best shown in FIG. 29, a second or alternative pair of hooks 18a is preferably provided that are interchangeable with the first pair of hooks 18 and can also be removably secured to the hook locations 46, 47 of the attachment bracket 43 with snap lock connections similar to the first pair of hooks 18. The illustrated second pair of hooks 18a is sized larger than the first pair of hooks 18 by having longer first and second portions of the hook portion 51. The illustrated first pair of hooks 18 are sized and shaped for a metal wire type shopping cart basket 12 while the illustrated second pair of hooks 18a are sized and shaped for a molded plastic type shopping cart basket 12. Thus, the user can select a desired pair of the plurality of pairs of hooks 18, 18a and install them at a desired pair of the plurality of pairs of hook locations 46, 47 depending on the size and shape of the shopping cart 11 to be used. The illustrated second pair of hooks 18a is formed of a plastic material but any other suitable material can alternatively be utilized. It is noted that the second pair of hooks 18a can alternatively have any other suitable configuration.

Figure 31:
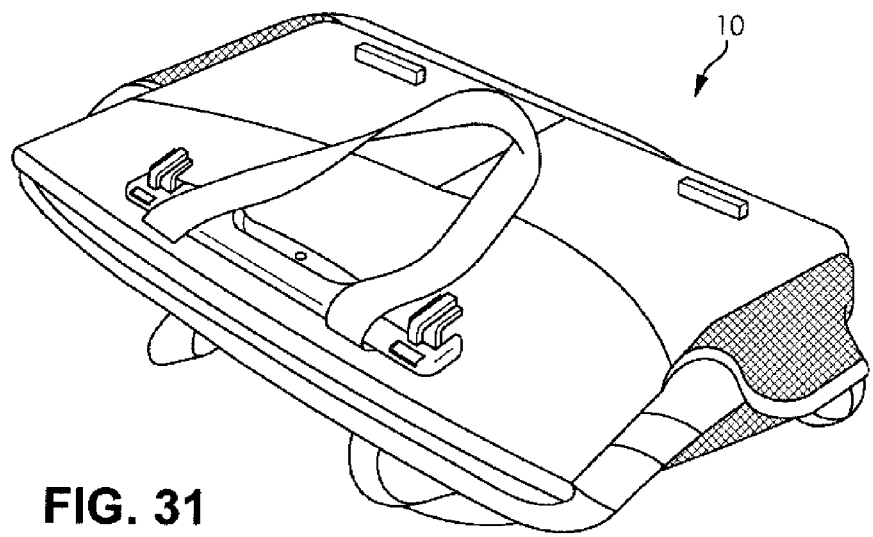
FIG. 31 is a front/left side perspective view of the collapsible storage device of FIGS. 1 to 7 in a collapsed or storage configuration.

As best seen in FIGS. 30 to 32, the illustrated collapsible storage device 10 is collapsed from the extended or use configuration to a collapsed or storage configuration by first disconnecting the hook and loop fasteners 42 of the swinging side support walls 38, 39 and pivoting the swinging side support walls 38, 39 to the rear wall 23 so that they no longer support the left and right side walls 20, 21. With the left and right side walls 20, 21 unsupported, the front wall 22 is folded down onto the bottom wall 19 as the left and right side walls 20, 21 are folded inward. The rear wall 23 then is pivoted down over the front and side walls 2, 20, 21 so that the collapsible container 15 is substantially flat. In the collapsed or storage configuration, the collapsible container 15 has a relatively flat or low profile relative to it's extended or used configuration.

FIGS. 33 to 37 illustrate an accessory pouch 56 that can be used with the storage device 10 described above. The illustrated accessory pouch 56 provides additional storage pockets and can be supported on one of the side walls 20, 21 of the collapsible storage device 10. The illustrated accessory pouch 55 includes a main panel 57 of woven fabric having a rectangular shape, a front panel 58 of woven fabric secured to the lower end of the main panel 57 and having a height less than the main panel 57, an intermediate panel 59 of woven fabric secured between the front and main panels 58, 57 and having a less than the main panel 57 and more than the front panel 58, a rear panel 60 of woven fabric secured to the lower end of the main panel 57 and having a height less than the main panel 57, and a strap 61 having ends secured between the rear panel 60 and the main panel 57 and forming a loop handle extending above the main panel 57. The illustrated accessory pouch 55 also includes a cover panel 62 of woven fabric secured to the upper end of the rear side the main panel 57 and forming separate pockets one above the other and between the main panel 57 and the cover panel 62 for a plurality of rigid support panels 63. The illustrated support panels 63 each have a length of about 8.8 inches to extend substantially the full width of the accessory pouch 55, a height of about 1.75 inches, and a thickness of about 0.125 inches but any other suitable size and/or shape can alternatively be utilized. The illustrated support panels 63 are each in the form of a rigid panel or board such as, for example, a plastic board. The plastic board can comprise polyethylene or any other suitable material. The panels 57, 58, 59, 60, 63 of woven fabric are secured together by stitching and preferably have a binding material 64 about the periphery of the main panel 57. The fabric can be coated poly nylon or any other suitable material. It is noted that the accessory pouch 55 can alternatively have any other suitable configuration.

Figure 38:
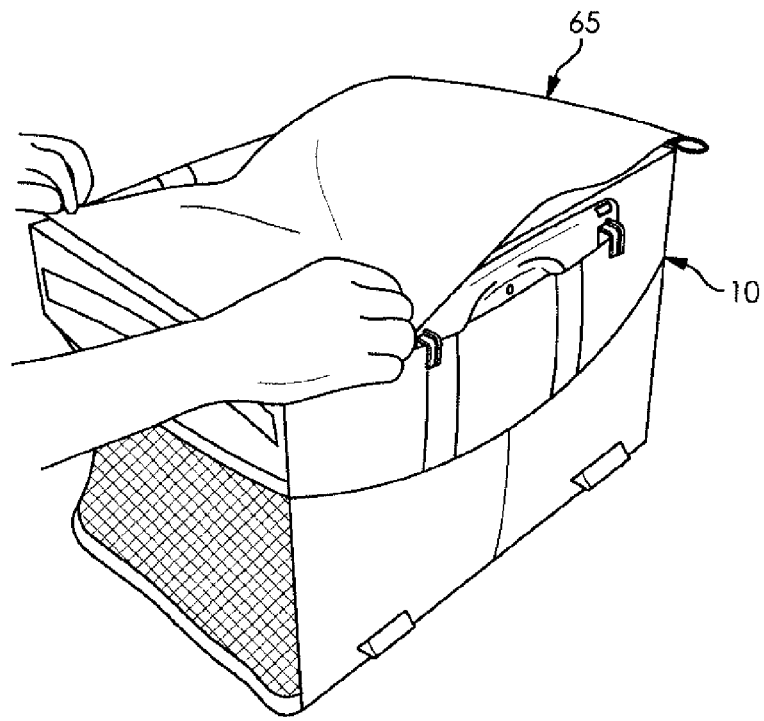
FIG. 38 is a rear/left side perspective view of the collapsible storage device of FIGS. 1 to 7 with a removable top cover closing the top opening.
Figure 39:
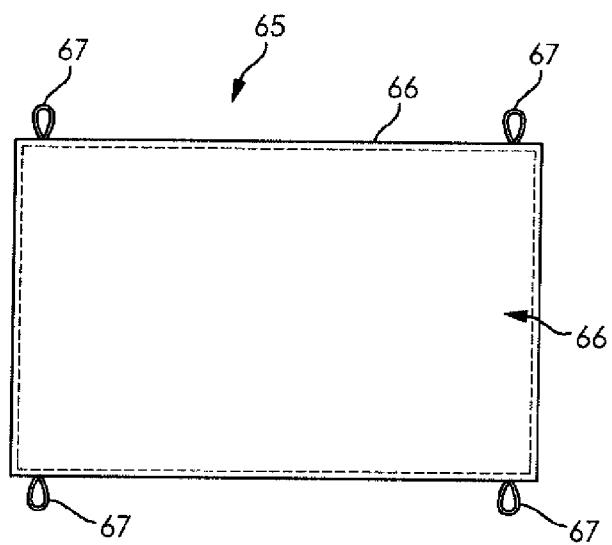
FIG. 39 is a top view of the removable top cover of FIG. 38.

FIGS. 38 and 39 illustrate a removable cover or lid 65 that can be used with the collapsible storage device 10 described above. The illustrated removable cover 65 can be selectively used to close the open top of the collapsible container 15 when desired. The illustrated cover 65 includes a main panel 66 of woven fabric having a rectangular shape and loops 67 of an elastic material located at the corners of the main panel 66. the main panel 66 is sized and shaped to closely cover the top opening of the collapsible container 15. The main panel 66 of woven fabric and elastic loops 67 are secured together by stitching. The fabric can be coated poly nylon or any other suitable material. It is noted that the removable cover 65 can alternatively have any other suitable configuration.

Any of the features or attributes of the above the above described embodiments and variations can be used in combination with any of the other features and attributes of the above described embodiments and variations as desired.

It is apparent from the above detailed description of preferred embodiments of the present invention, that the above-disclosed collapsible storage device 10 provides shoppers additional cart space, and/or the ability to separate items to be purchased. The collapsible storage device 10 also allows shoppers to have their child in the shopping cart 11 while providing additional space for grocery's etc. The collapsible storage device 10 further permits items to be moved from shopping cart 11 to a car, without use of disposable paper or plastic bags, and/or to provide added storage of additional bags. Moreover, the collapsible storage device 10 can be collapsed when not in use for convenient storage such as in the trunk of a car.

From the foregoing disclosure and detailed description of certain preferred embodiments, it is also apparent that various modifications, additions and other alternative embodiments are possible without departing from the true scope and spirit of the present invention. The embodiments discussed were chosen and described to provide the best illustration of the principles of the present invention and its practical application to thereby enable one of ordinary skill in the art to utilize the invention in various embodiments and with various modifications as are suited to the particular use contemplated. All such modifications and variations are within the scope of the present invention as determined by the appended claims when interpreted in accordance with the benefit to which they are fairly, legally, and equitably entitled.

What is claimed is:

1. A storage device for removable attachment to a shopping cart, the storage device comprising, in combination:
    a collapsible container having an interior storage space accessible through an upper opening; and
    an attachment assembly secured to the collapsible container and including at least one attachment for removably securing the collapsible container to the shopping cart; and
    wherein the at least one attachment comprises a pair of hooks interchangeably and removably secured to a first pair of spaced-apart predetermined attachment locations of the attachment assembly with snap-lock connections and a second pair of spaced-apart predetermined locations of the attachment assembly with snap-lock connections.

2. The storage device according to claim 1, wherein the attachment assembly includes an attachment bracket secured to the collapsible container and forming the first pair of spaced-apart predetermined attachment locations and the the second pair of spaced-apart predetermined locations.

3. The storage device according to claim 1, wherein the at least one attachment comprises an alternative pair of hooks interchangeable with the pair of hooks, and the alternative pair of hooks have a different size than the pair of hooks.

4. The storage device according to claim 1, wherein the collapsible container is convertible between a use configuration wherein the interior storage space is usable for storage of items and a storage configuration wherein the collapsible container is substantially flat and the interior storage space is not usable for storage of items.

5. The storage device according to claim 4, wherein the wherein the collapsible container is configured as a rectangular-shaped tote bag having a bottom wall, left and right side walls extending up from left and right side edges of the bottom wall respectively, and front and rear walls extending up from front and rear edges of the bottom wall respectively and connecting the left and right side walls so that the bottom wall, the left side wall, the right side wall, the front wall, and the rear wall cooperate to form the interior storage space accessible through the upper opening.

6. The storage device according to claim 5, wherein the bottom wall, the left side wall, the right side wall, the front wall, and the rear wall each comprise a flexible fabric and are supported by rigid support panels so that the collapsible container is self-supporting in the use configuration.

7. A storage device for removable attachment to a shopping cart, the storage device comprising, in combination:
    a collapsible container having an interior storage space accessible through an upper opening;
    an attachment assembly secured to the collapsible container and including a pair of hooks for removably securing the collapsible container to the shopping cart; and
    wherein the pair of hooks are removably and interchangeably secured to a first pair of spaced-apart predetermined attachment locations, and a second pair of spaced-apart predetermined attachment locations; and
    wherein the attachment assembly includes an attachment bracket forming the first pair of spaced-apart predetermined attachment locations and the second pair of spaced-apart predetermined attachment locations, and the pair of hooks are secured to the attachment bracket with snap-lock connections.

8. The storage device according to claim 7, wherein the attachment assembly comprises an alternative pair of hooks interchangeable with the pair of hooks, and the alternative pair of hooks have a different size than the pair of hooks.

9. The storage device according to claim 7, wherein the collapsible container is convertible between a use configuration wherein the interior storage space is usable for storage of items and a storage configuration wherein the collapsible, container is substantially flat and the interior storage space is not usable for storage of items.

10. The storage device according to claim 9, wherein the wherein the collapsible container is configured as a rectangular-shaped tote bag having a bottom wall, left and right side walls extending up from left and right side edges of the bottom wall respectively, and front and rear walls extending up from front and rear edges of the bottom wall respectively and connecting the left and right side walls so that the bottom wall, the left side wall, the right side wall, the front wall, and the rear wall cooperate to form the interior storage space accessible through the upper opening.

11. The storage device according to claim 1, wherein the second pair of spaced-apart predetermined locations are spaced apart a greater distance than the first pair of spaced-apart predetermined attachment locations.

12. The storage device according to claim 2, wherein the attachment bracket is secured to the collapsible container with mechanical fasteners extending between the attachment bracket to a bar to clamp a rear wall of the collapsible container between the attachment bracket and the bar.

13. The storage device according to claim 12, wherein the attachment bracket comprises plastic the bar comprises metal.

14. The storage device according to claim 1, wherein the first pair of spaced-apart predetermined locations and the second pair of spaced-apart predetermined attachment locations face the same direction.

15. The storage device according to claim 7, wherein the alternative pair of spaced-apart predetermined locations are spaced apart a greater distance than the pair of spaced-apart predetermined attachment locations.

16. The storage device according to claim 7, wherein the attachment bracket is secured to the collapsible container with mechanical fasteners extending between the attachment bracket to a bar to clamp a rear wall of the collapsible container between the attachment bracket and the bar.

17. The storage device according to claim 16, wherein the attachment bracket comprises plastic the bar comprises metal.

18. The storage device according to claim 7, wherein the pair of spaced-apart predetermined locations and the alternative pair of spaced-apart predetermined attachment locations face the same direction.

19. The storage device according to claim 10, wherein the bottom wall, the left side wall, the right side wall, the front wall, and the rear wall each comprise a flexible fabric and are supported by rigid support panels so that the collapsible container is self-supporting in the use configuration.

* * * * *